United States Patent [19]

Tatsumi et al.

[11] Patent Number: 5,832,491
[45] Date of Patent: Nov. 3, 1998

[54] SYSTEM FOR PROCESSING A DATABASE RELOCATION IN PARALLEL WITH THE EXECUTION OF AN APPLICATION PROGRAM

[75] Inventors: Toshiharu Tatsumi; Mitsuhide Nishino, both of Kawasaki, Japan

[73] Assignee: Fujitsu Limited, Kawasaki, Japan

[21] Appl. No.: 658,309

[22] Filed: Jun. 5, 1996

Related U.S. Application Data

[63] Continuation of Ser. No. 92,499, Jul. 16, 1993, abandoned.

[30] Foreign Application Priority Data

Sep. 25, 1992 [JP] Japan .................................. 4-256328

[51] Int. Cl.$^6$ ........................................................ G06F 17/30
[52] U.S. Cl. .......................................................... 707/101
[58] Field of Search ............................................. 707/101

[56] References Cited

U.S. PATENT DOCUMENTS

| | | | |
|---|---|---|---|
| 4,878,167 | 10/1989 | Kapulka et al. | 395/575 |
| 5,239,646 | 8/1993 | Kimura | 395/575 |

FOREIGN PATENT DOCUMENTS

| | | |
|---|---|---|
| 0 351 387 | 1/1990 | European Pat. Off. . |
| 57-162053 | 10/1982 | Japan . |
| 63-113644 | 5/1988 | Japan . |
| 2-113350 | 4/1990 | Japan . |
| 02116936 | 5/1990 | Japan . |
| 02212949 | 8/1990 | Japan . |
| 2-212949 | 8/1990 | Japan . |

OTHER PUBLICATIONS

Kishmoto, et al, translation of Japaness patent appliction 2–212949 already of record, Aug. 1990.

Sockut, G. H., "A Performance Model for Computer Data-Base Reorganization Performed Concurrently with Usage", *Operations Research*, vol. 26, No. 5, pp. 789–803, Oct. 1978.

Soderlund, L., "Evaluation of Concurrent Physical Database Reorganization Through Simulation Modeling", ACM, vol. 10, No. 3, pp. 19–32, 1981.

Omiecinski et al, "Concurrent File Reorganization for Record Clustering: A Performance Study," IEEE, Feb. 1992, pp. 265–272.

Franaszek et al., "Reduction of Storage Fragmentation On Direct Access Devices," *IBM Journal of Research and Development*, vol. 23, No. 2, Mar. 1979, New York, NY, pp. 140–148.

*Primary Examiner*—Thomas G. Black
*Assistant Examiner*—Jack M. Choules
*Attorney, Agent, or Firm*—Staas & Halsey

[57] ABSTRACT

A system for relocating records in a database having a prime region and an overflow region in parallel with a service processing. The system is provided with a database relocation utility which acquires exclusive access to regions of the prime region and the overflow region for which the service processing has not acquired exclusive access. The system saves a predetermined number of records of the prime region and the overflow region into a data save area. Thereafter, the system relocates the records by packing them in one of the prime region and the overflow region.

10 Claims, 14 Drawing Sheets

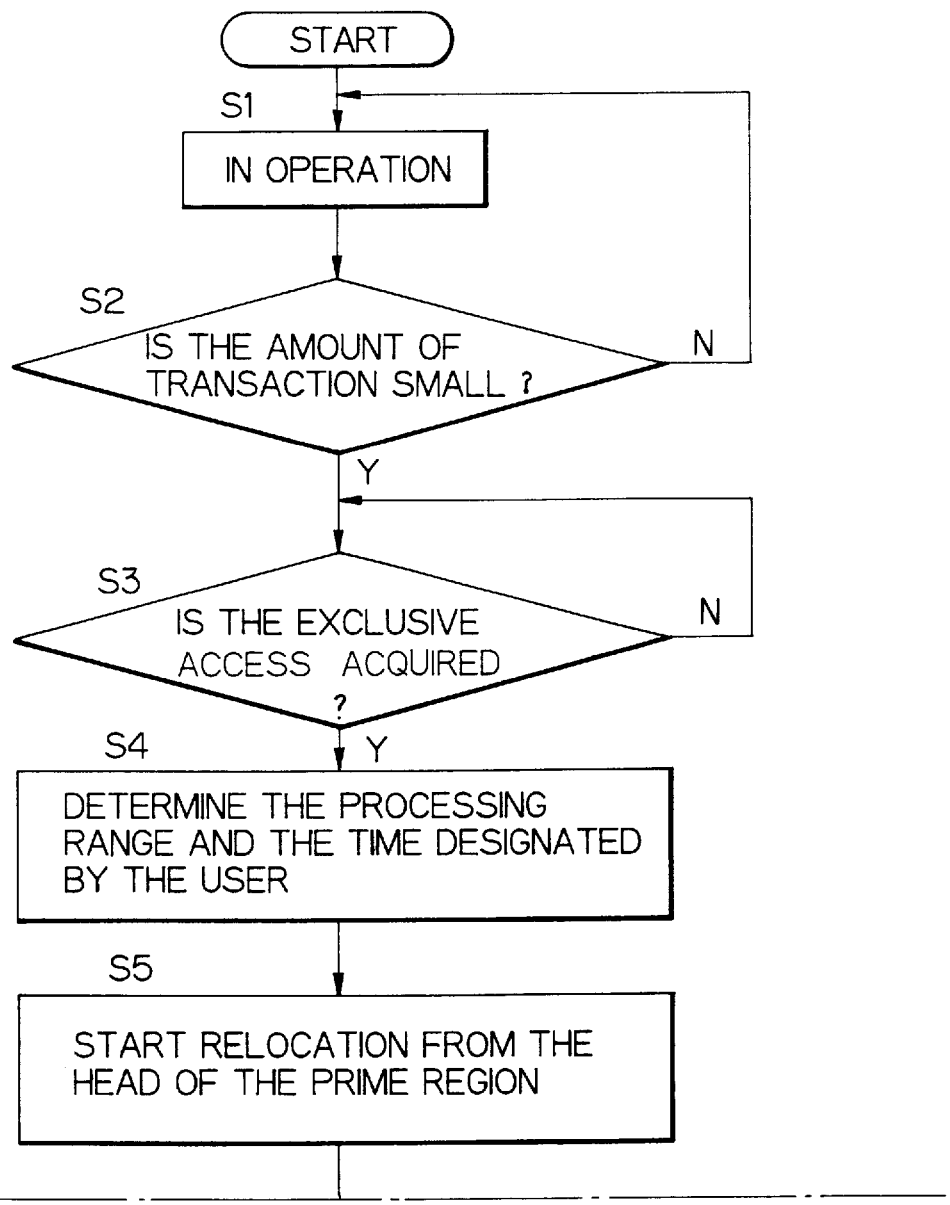

Fig. 6

|  | OCCUPATION FLAG | USER ID |
|---|---|---|
| LOGIC PAGE 1 | 0 | |
| LOGIC PAGE 2 | 1 | ID : AA |
| LOGIC PAGE 3 | 0 | |
| LOGIC PAGE 4 | 0 | |

SYSTEM FOR PROCESSING A DATABASE RELOCATION IN PARALLEL WITH THE EXECUTION OF AN APPLICATION PROGRAM

This application is a continuation of application Ser. No. 08/092,499, filed Jul. 16, 1993, now abandoned.

BACKGROUND OF THE INVENTION

1. Field of the Invention

The present invention relates to a system for processing a database relocation in parallel.

2. Description of the Related Art

In a network database, parts of empty regions spanning the overflow region generated by the addition of records to the database or by the deletion thereof, must be regularly relocated (repacking of records in the overflow region).

This relocation has heretofore been carried out by stopping the service to the application programs which use the data base. The conventional relocation method will be briefly described as follows.

A data base is constituted by a prime region and an overflow region which stores records when there is no empty record in the prime region, and enables a variety of data to be quickly accessible.

A relocation utility relocates the records in the prime region and in the overflow region when the operation of an application problem has been halted.

The relocation utility effects the relocation of the whole region, at one time, when the operation of the database is temporarily halted. The relocation consists of successively packing significant records, stored in the prime region, and the overflow region starting from the head of the prime region. When the the overflow region becomes empty, the memory space is returned to main memory in order to effectively utilize memory resources the records in the overflow region are transferred to the prime region in order to accomplish high-speed access.

While the relocation utility is effecting the relocation of the database, an application program is not allowed to access the database and data processing is interrupted. Moreover, since the application program is not allowed to access the database during the relocation of the database, a person who administers the database must ensure that time is dedicated to the relocation of the database, and he is required to manually perform a cumbersome operation which cannot be in parallel with the service processing. Moreover, since the data base as a whole is relocated at one time, a large amount of save area is required, when the significant records are brought to the save area and then relocated to be packed in the beginning of the prime region of the original data base.

SUMMARY OF THE INVENTION

In order to solve these problems according to the present invention, the prime region and the overflow region are relocated in parallel with the execution of the application program by acquiring exclusive access to each of the logic pages. The relocation is effected by limiting an amount of processing thereof being carried out for extended periods of time, and the application program is executed predominantly. The relocation processing is executed intermediately, such that the relocation of the database is executed in parallel and affects the operation of the application program as little as possible.

According to the present invention, there is provided a system for processing the datebase relocation in parallel comprising a database relocation utility by which a record, or plurality of records, in any prime region in a database and a record (or a plurality of records) in an overflow region are saved into a data save area, and are then packed and relocated in the prime region and in the overflow region, wherein said database relocation utility acquires exclusive access to the prime region and the overflow region for which the service processing has not acquired exclusive access, and saves the record (or the plurality of records) in the prime region and the overflow region into the data save area, and, then, relocates the records by packing them in the prime region or in the overflow region.

In the system for processing the database relocation in parallel, the database relocation utility acquires exclusive access and saves into the data save area a predetermined number of records (one of more) from the prime region and the overflow region, and then relocates the record by packing it and storing it in the prime region or in the overflow region. The relocation is effected for only the prime region and the overflow region, for which the application service processing has not acquired the exclusive access over a predetermined period of time.

Further, in the system, the database relocation utility acquires exclusive access to the prime region and the overflow region for which the application service processing is not acquiring exclusive access, saves a record (or a plurality of records) from the prime region and the overflow region into the data save area, and further preserves a data log therein, and, in case an instruction is issued to interrupt the relocation of records during packing them in the prime region and in the overflow region, restores the prime region and the overflow region based upon the data log that had been preserved during the interruption or the relocation.

BRIEF DESCRIPTION OF THE DRAWINGS

The present invention will be more clearly understood from the description as set forth below with reference to the accompanying drawings.

FIG. 6 is a table of exclusive processing according to the present invention.

DESCRIPTION OF THE PREFERRED EMBODIMENTS

Figure 1:
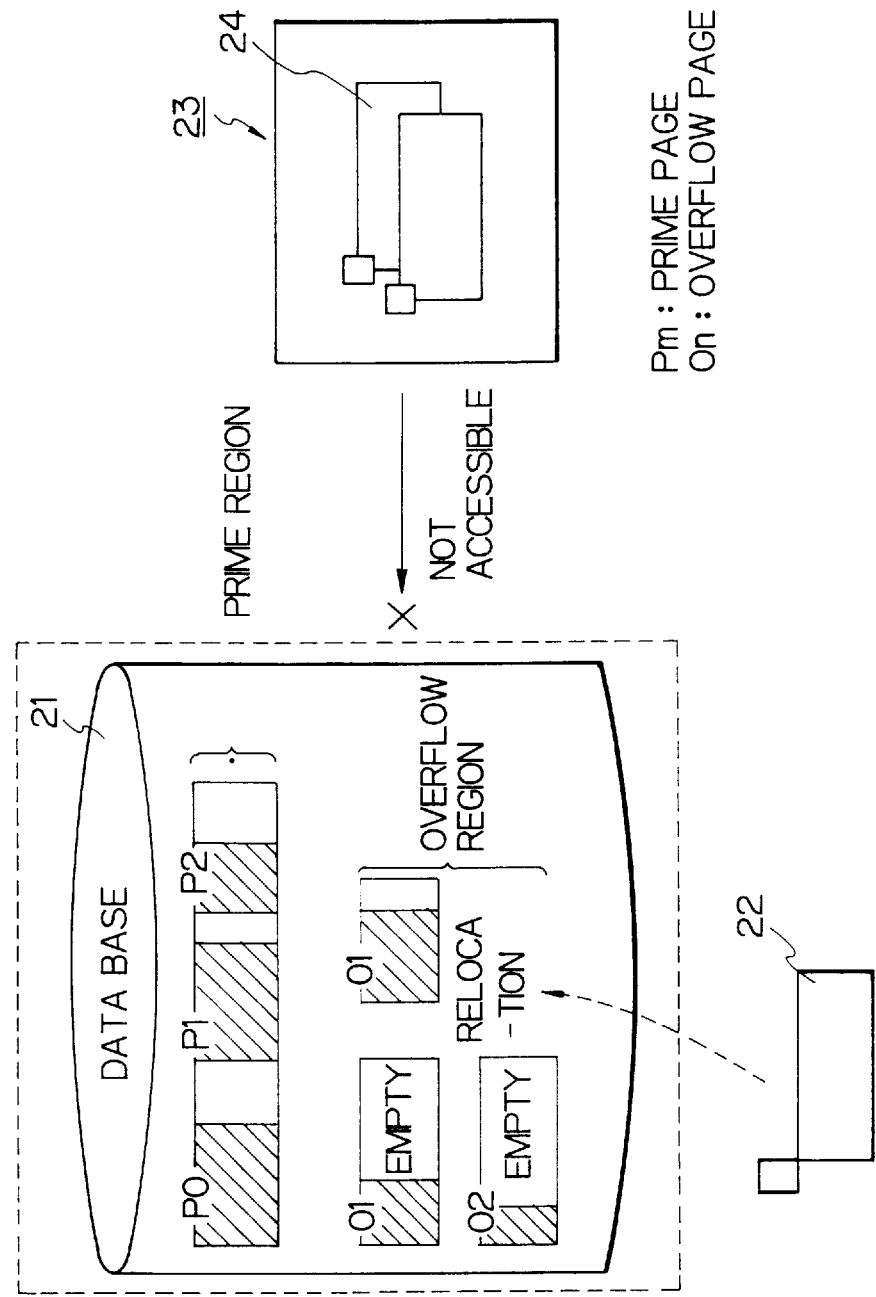
FIG. 1 is a diagram illustrating a conventional database relocation process.

Before describing the preferred embodiments according to the present invention, examples of the related art are provided with reference to FIG. 1.

FIG. 1 is a diagram illustrating the conventional database relocation processing.

In FIG. 1, a data base 21 is constituted by a prime region and an overflow region which stores records when there is not empty record in the prime region, and enables a variety of data to be quickly accessed.

A relocation utility 22 relocates the records in the prime region and in the overflow region when the operation of an application program 24 has been halted.

The service process 23 carries out a variety of services processings while making access to the database 21 using the application program 24.

The relocation utility 22 effects the relocation of the whole region at one time under the condition in which the operation of the data base 21 is temporarily halted. The relocation consists of successively packing significant records which are stored in the prime region and the overflow region starting from the head of the prime region. When the overflow region becomes empty, it is returned to main memory in order to effectively utilize the memory resources, and by transferring the records in the overflow region into the prime region high-speed access is accomplished.

When the relocation utility 22 is effecting the relocation of the database 21, therefore, the application program 24 is not allowed to access the database 21 and service processing is interrupted. Moreover, since it is not allowed to access the database using the application program 24 during the relocation of the database 21, a person who administers the database must designate a time dedicated to the relocation of the database 21, which a cumbersome operation which cannot be carried out in parallel with the service processing. Moreover, since the data base as a whole is relocated at one time, large amounts of memory for a save region is required when the significant records brought to the save region are to be packed and relocated starting with the prime region of the original database 21.

Figure 2:
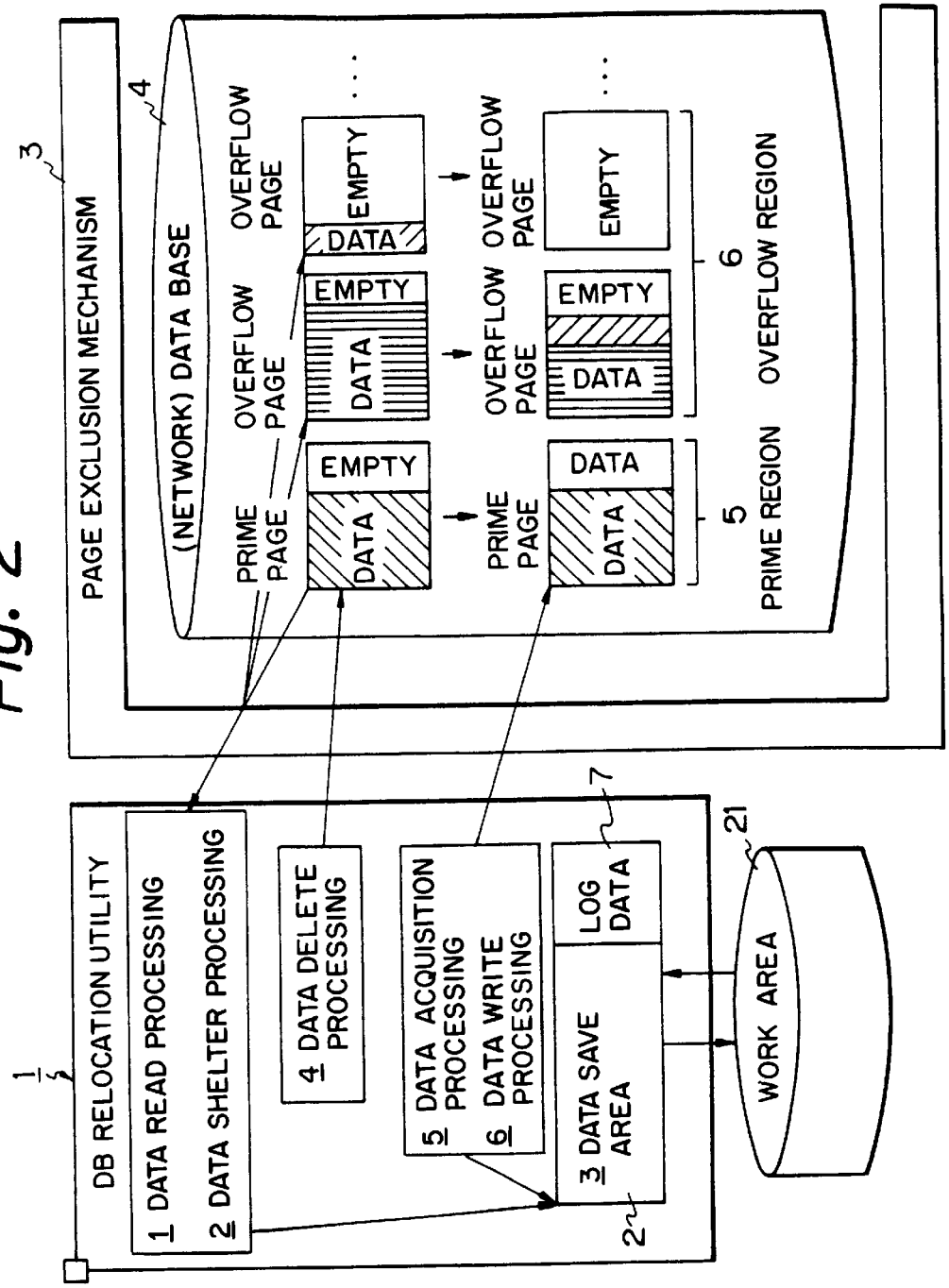
FIG. 2 is a diagram illustrating the constitution of an embodiment of the present invention.

Described below with reference to FIG. 2 is a means for solving the problems according to the present invention.

In FIG. 2, a database relocation utility 1 saves into a data save area 2 a record (or a plurality of records) of a given prime region 5 in the database 4 and a record (or a plurality of records) of an overflow region 6, and then packs and relocates them starting with the prime region 5 and the overflow region 6 linked thereafter.

The prime region 5 is for storing the records in the database 4. The overflow region 6 is for storing the records when they can not be stored in the prime region 5, i.e., when the records overflow the prime region 5.

A datalog 7 (or LOG DATA) is preserved for restoring the records in the prime region 5 and in the overflow region 6 during the relocation.

According to the present invention as shown in FIG. 2, the database relocation utility 1 saves into the data save area 2 the record (or a plurality of records) of a given prime region 5 in the data base 4 and the record (or a plurality of record) in the overflow region 6, and then packs and relocates them starting with the prime region 5 and the overflow region 6 linked thereafter.

Moreover, the database relocation utility 1 acquires exclusive access and saves into the data save area 2 a predetermined number of records (one or more) of the prime region 5 and of the overflow region 6, and then packs and relocates them starting with the prime region 5 and the overflow region 6 linked thereafter.

Furthermore, the database relocation utility 1 effects the relocation for only those prime regions 5 and the overflow regions 6 for which the service processing has not acquired exclusive access over a predetermined period of time.

Moreover, the database relocation utility 1 acquires exclusive access to the prime region 5 and the overflow region 6 for which the service processing has not acquired exclusive access. The database relocation utility 1 then saves a record (or a plurality of records) of the prime region 5 and the overflow region 6 into the data save area 2 and preserves a data log 7 therein. In case an instruction is issued to interrupt the relocation of records by packing them in the prime region 5 and in the overflow region 6, the data relocation utility 1 restores the prime region 5 and the overflow region 6 based upon the data log 7 that had been preserved during the interruption of the relocation.

It is therefore possible to relocate the prime region 5 and the overflow region 6 for which the exclusive access right has been acquired for each record (or a plurality of records) in parallel with the execution of the application program. This effects the relocation in a limited amount to avoid the processing thereof from being carried out for extended periods of time. Further, this enables the application program to predominantly execute or to enable the execution of the relocation processing intermittently, such that the relocation of the database 4 is executed in parallel affecting the operation of the application program as little as possible.

The constitution and operation of the embodiment of the present invention will now be described in detail in conjunction with FIGS. 2 to 13.

FIG. 2 is a diagram illustrating the constitution of an embodiment of the present invention.

In FIG. 2, the database relocation utility 1 is capable of being operated in parallel with the application program which performs a variety of processes by accessing the database 4. The database relocation utility 1 works to save into the data save area 2 a record (or a plurality of records) of a given prime region 5 in the data base and a record (or a plurality of records) of the overflow region 6 and then packs and relocates the records in the prime region 5 or in the overflow region 6 to relocate them (this will be described later with reference to FIG. 3).

The data save area 2 is the one into where the records are saved from the prime region 5 and the overflow region 6 so that the data can be relocated.

The work area 21 is the one provided in an external storage unit such as DASD and stores the records when the data save area 2 in the memory is filled with records.

The datalog 7 is preserved for restoration in case the relocation of the prime region 5 and the overflow region 6 is interrupted.

A page exclusion mechanism 3 administers the exclusive access to a logic page in the prim region 5 and the overflow region in the database 4.

The database 4 is, for example, a network database which is constituted to store large amounts of data in the prime region 5 and then in the overflow region 6 when the data overflows from the prime region 5.

The prime region 5 stores the data in the database 4 with a record as a unit. As will be described later with reference to FIG. 7, in the prime region 5, the records storing significant data are linked by the record pointer in the common region, and the records out of use are linked by the deleted record pointer in the common region.

The overflow region 6 stores the data which is no longer stored in the prime region 5. As will be described later with reference to FIG. 7, the overflow region 6 stores the data linked to the records when the prime region 5 is filled with the records linked to the record pointer.

The operation of the constitution of FIG. 2 will now be roughly described in the order of ① through ⑥ in FIG. 2.

① The data read processing is carried out. This is to read the data for each of the records in the prime region 5 and in the overflow region 6 in the database 4.

② The data save processing is carried out. In this processing, the data read out from the database 4 with the record as a unit are stored in the data save area 2 of ③. When the capacity of the data save area 2 provided in the memory is not sufficient, the data are stored in the work area 21 in an external storage unit such as DASD.

④ The data deletion processing is carried out. After the data are stored in the data save area from the database 4 with the record as a unit through the processings ① to ③, the record deletion processing is carried out (this is linked to the deleted record pointer that will be described later).

⑤ Data acquisition processing is carried out. In this processing, the data are taken out from the data save area 2 or from the work area 21.

⑥ The data write processing is carried out. In this processing, the data taken out in ⑤ above are successively written with the record as a unit from the head of the prime region 5, and are relocated (the data are written into records which are then linked to the record pointer). Any overflow regions 6 that are not used are returned.

As described above, the records are taken from the prime region 5 and the overflow region 6 in the database 4 and are stored in the data save area 2 and the records are deleted and, then, the records taken from the data save area 2 are packed and written back in the prime region 5 or in the overflow region 6, and are relocated. Then, the database relocation utility 1 acquires exclusive access to the prime region 5 and the overflow region 6 that are not being used in parallel with the execution of the application program (not shown), stores the records of the prime region 5 and the overflow region 6 successively in the data save area 2, packs and writes back the data successively into the prime region 5 or the overflow region 6 and relocates them, so that the data can be accessed at high speed.

The operation of the constitution of FIG. 2 will now be described in detail in compliance with the flowcharts of FIGS. 3(a) and 3(b).

In FIGS. 3(a) and 3(b), the operation is being carried out in a step S1. This means that the operation of the database 4 of FIG. 2 is halted.

A step S2 determines whether the transaction is rarely produced or not. This is to determine if the amount of the transaction in operation for the database 4 of FIG. 2 is small. For instance, it is determined if the frequency of access to the database 4 is small, if it is a time period in which the frequency of access is small, and if the service is very little affected by the relocation processing. When the answer is yes, the relocation of records is started in the database in a step S3 and in subsequent steps.

The step S3 determined whether the exclusive access has been acquired or not. This is to determine whether the exclusive access has been acquired for the prime region 5 and the overflow region 6 that are to be relocated, so that the database 4 can be relocated. When the answer is yes, the program proceeds to a step S4. When the answer is no, the program waits until the exclusive access is acquired.

The step S4 determines the processing range and the time designated by a user. This determines the processing range and the time for relocation designated by the user.

A step S5 initiates the relocation from the head of the prime region. This is to initiate the relocation from the head of the prime region for which the exclusive access is acquired.

A step S6 determines whether the overflow region 6 is used. This is to determine whether the prime region 5 that has initiated the relocation has acquired the overflow region 6 to store the records. When the answer is yes, the relocation is carried out through the steps S7 to S10. When the answer is no, it means that the overflow region 6 is not used and the records are not stored. Therefore, the exclusive access is released at a step 11 and the program is finished.

The step S7 maintains the work area. This is to maintain the work area where the records to be relocated are stored (e.g., to maintain the data save area 2 of FIG. 2 or to maintain the work area 21 when the data save area 2 is not sufficient).

The step S8 successively takes out the records from the prime region 5, stores them in the work area, and renders the records to be deleted records. That is, the records are taken out from the prime region 5 and the overflow region 6 in the database 4, stored in the work area, and the records are linked to the deleted records pointer and are rendered to be deleted records.

The step S9 writes the records in the work area onto the prime region. This is to successively write the records saved in the work area starting from the head of the initial prime region and to link them to the record pointer.

The step S10 returns the unnecessary overflow region 6. This is to return the overflow region 6 that is now unnecessary as a result of the relocation of records in order to effectively utilize the overflow region 6.

The step S11 release the exclusive access.

As described above, exclusive access is acquired when the volume of transactions is small during the operation of the database 4, the data are saved into the work area from the prime region 5 and the overflow region 6 with the record as a unit, and the data are then successively stored and relocated in the prime region 5. Thus, the records are relocated in the prime region 5 and in the overflow region 6 in parallel with the application program, and are accessible at high speed.

Figure 4:
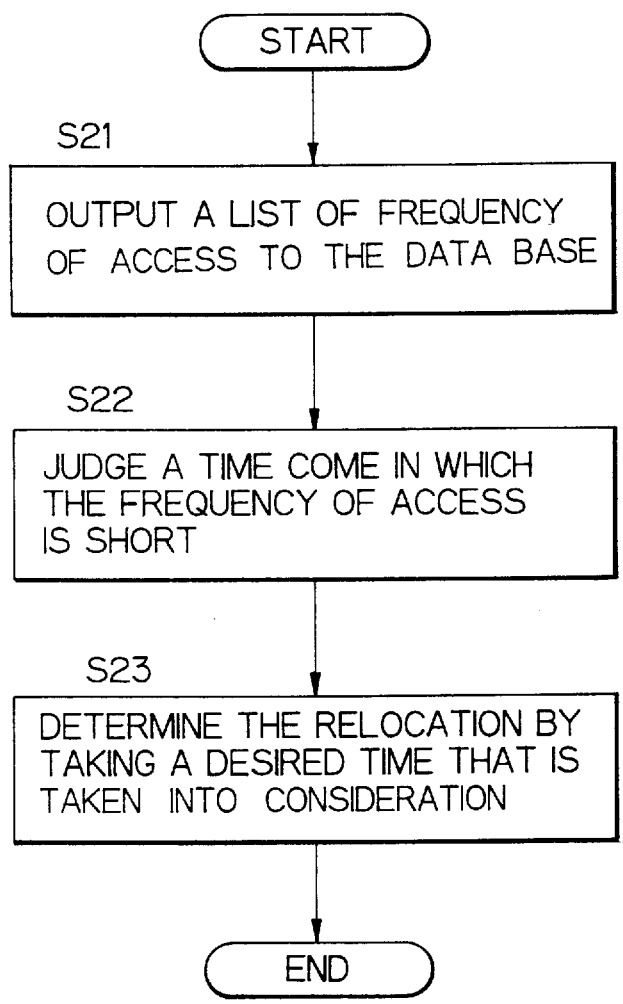
FIG. 4 is a flowchart for determining a starting time of the relocation according to the present invention.

FIG. 4 is a flowchart of a period for starting the relocation according to the present invention.

In FIG. 4, a step S21 outputs a list of frequency of access to the database 4. This is to output a list of frequency of access to the database 4 over the time.

A step S22 determines the time period in which the frequency of access is small. This is to determine a time period in which the frequency of access is small from the list of frequency of access output at the step S21 (instructed by a person who administers the database or is determined by automatically finding the time period in which the frequency of access is small).

A step S23 determines the relocation by taking a desired time that is instructed into consideration. This is to determine a time period for effecting the relocation by taking into consideration the desired time (e.g., a time at night when the database 4 is operated less) as instructed by the user.

Figure 3:
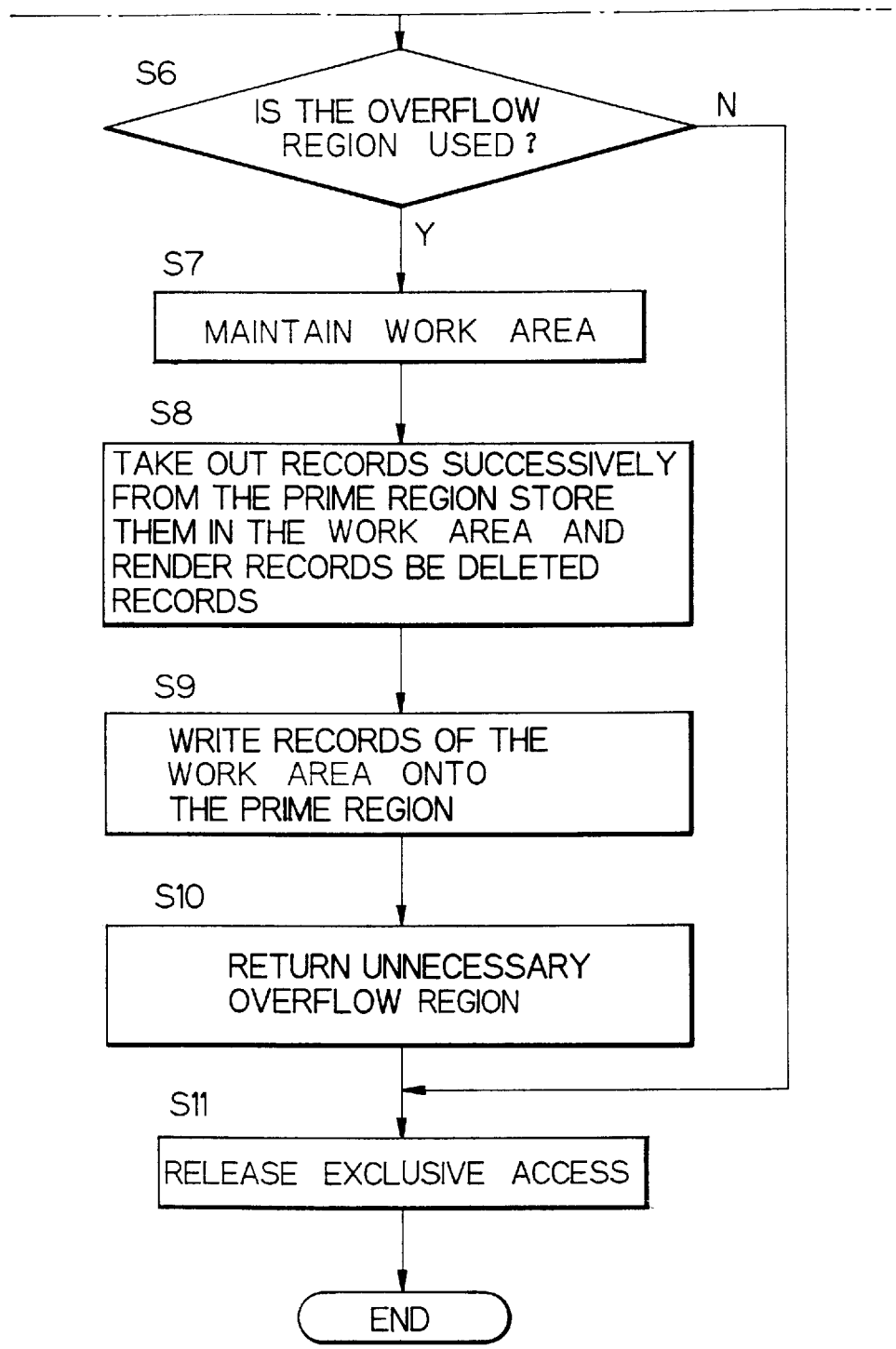
FIGS. 3A and 3B are flowcharts explaining the operation of the present invention.

When the determined time period for relocation is the time in which the amount of transaction is small as found in the step S2 of FIG. 3(*a*) and the relocation is to be effected, exclusive access is acquired and the database 4 is relocated and, then, the exclusive access is released.

Figure 5:
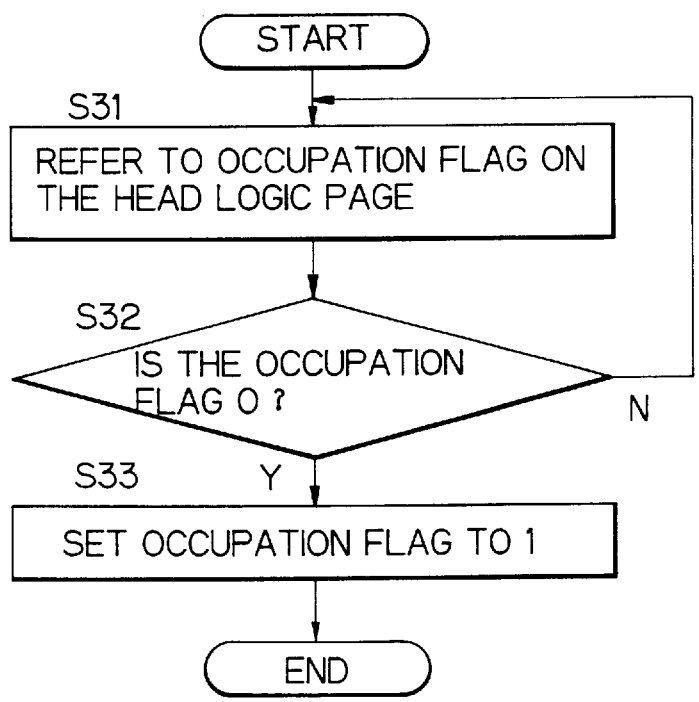
FIG. 5 is a flowchart for ensuring exclusive processing according to the present invention.

FIG. 5 is a flowchart for ensuring exclusive access according to the present invention.

In FIG. 5, a step S31 makes reference to an occupation flag in the beginning of logic pages. This is to make reference to whether the occupation flag (flag representing whether exclusive access is acquired or not) of the beginning of logic pages of the database 4 is "0" or "1" (occupied), e.g., whether the occupation flag provided for each of the logic pages of the database 4 has "0" or "1" (occupied) as shown in FIG. 5.

A step S32 determines whether the occupation flag is "0" (not occupied). When the answer is yes, it is now determined that exclusive access to the logic page has not been acquired by the application program which is carrying out the service. Then, a step S33 sets the occupation flag to 1 to acquire exclusive access, whereby the answer at the step S3 of FIG. 2 becomes yes, and the relocation is started. When the answer is no, on the other hand, the exclusive access of the logic page is acquired by the application program that is carrying out the service. It is now found that the service is carried out while making access, and the program waits until the exclusive access is released.

As described above, exclusive access is successively acquired starting from the logic page at the head of the database 4, and the relocation is carried out, and thereafter, the exclusive access is released. It is thus allowed to carry out the relocation processing by the database relocation utility 1 by acquiring exclusive access in parallel with the service processing executed by the application program that makes access by acquiring exclusive access to the logic page as a unit.

FIG. 6 shows a Table of exclusive access processing according to the present invention. In this Table of exclusive access processing as shown, the occupation flag and the user's ID are set correspond to the logic page of the database 4. Here, the occupation flag on logic page 2 is "1", and the user with an ID of "AA" acquires the exclusive access to the logic page 2, and the processing (relocation processing or service processing) is carried out.

Figure 7:
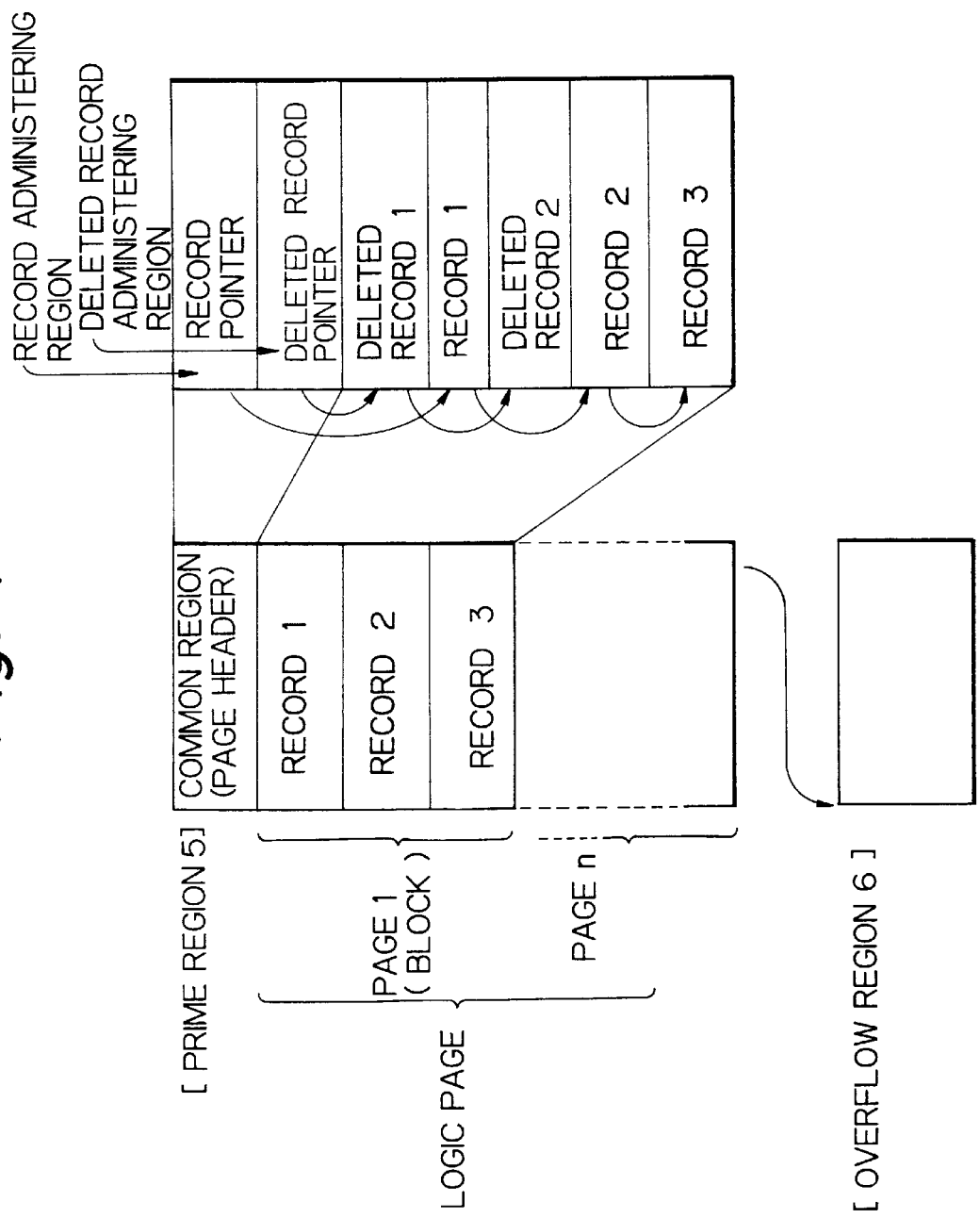
FIG. 7 is a diagram illustrating a method of administering records and deleting records according to the present invention.

FIG. 7 illustrates a method of administering records and deleting records according to the present invention.

In FIG. 7, the prime region 5 is one consisting of a logic page. This logic page is constituted by page 1 through page n. A common region (page header) exists at the head of the logic page. As shown on an enlarged scale on the right side, the common region includes a record pointer which points to significant records and a deleted record pointer which points to empty records. The record pointer successively links the records in a manner of, for example, record-1-record-2-record-3. The deleted record pointer successively links the records in a manner of deleted record-1-deleted record-2. When a record is deleted, a record linked by the record pointer is reattached so as to be linked by the deleted record pointer as will be described later with reference to FIGS. 10(*a*) and 10(*b*).

The overflow region 6 is the one that is acquired when the records can no longer be stored in the prime region 5, and is linked to the prime region 5 as shown.

As described above, the common region is provided at the head of the logic page, and the records are successively linked from the record pointer in the common region and are administered. When the record is deleted, the record is so reattached that it can be linked by the deleted record pointer in the common region. Therefore, when the record is to be saved into the data save area 2 (work area) from the prime region 5 and the overflow region 6, the data in the record is stored in the data save area 2 via the record pointer, and the record is reattached so as to be linked to the deleted record pointer. When the record is to be stored in the prime region 5 from the data save area 2, on the other hand, the data are stored in an empty record linked to the deleted record pointer, and this record is so reattached that it will be linked to the record pointer. Then, the record in the overflow region 6 is relocated in the prime region so that it is accessible at high speed.

Figure 8:
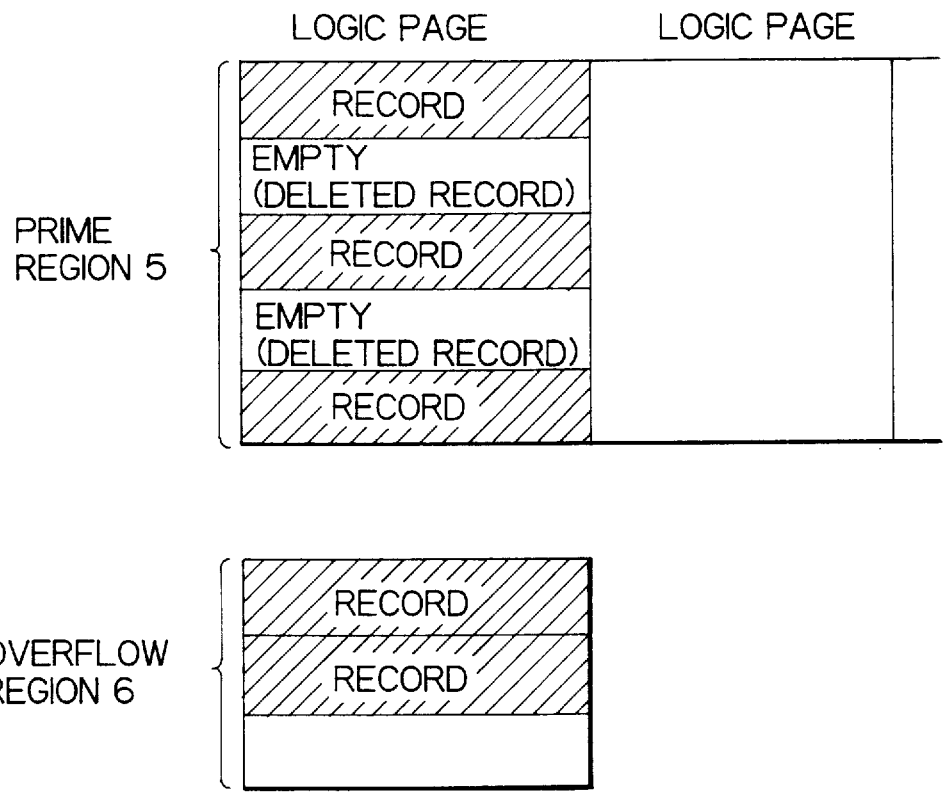
FIGS. 8A and 8B are a diagram illustrating the saving of records into the work area according to the present invention.
Figure 8:
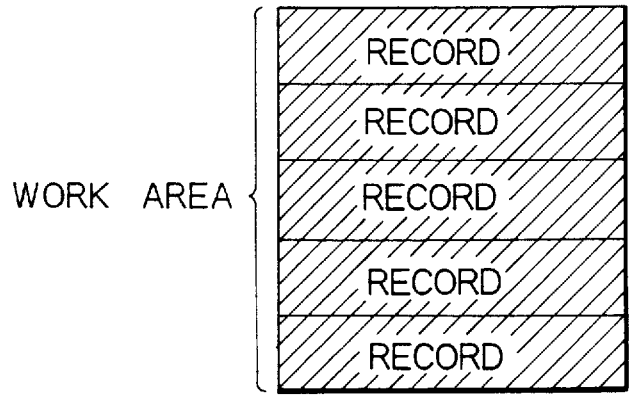

FIGS. 8(*a*) and 8(*b*) are diagrams illustrating the save of records into the work area according to the present invention.

In FIG. 8(*a*), five records are stored in the prime region 5 and the overflow region 6 as shown.

FIG. 8(*b*) shows the state where the data of significant records (hatched records in the drawing) are read out from the prime region 5 and the overflow region 6 under the state of FIG. 8(*a*) and are stored in the work area.

Next, reattachment of the deleted record will be described with reference to FIGS. 10(*a*) and 10(*b*) in accordance with the order of a flowchart in FIG. 9.

Figure 9:
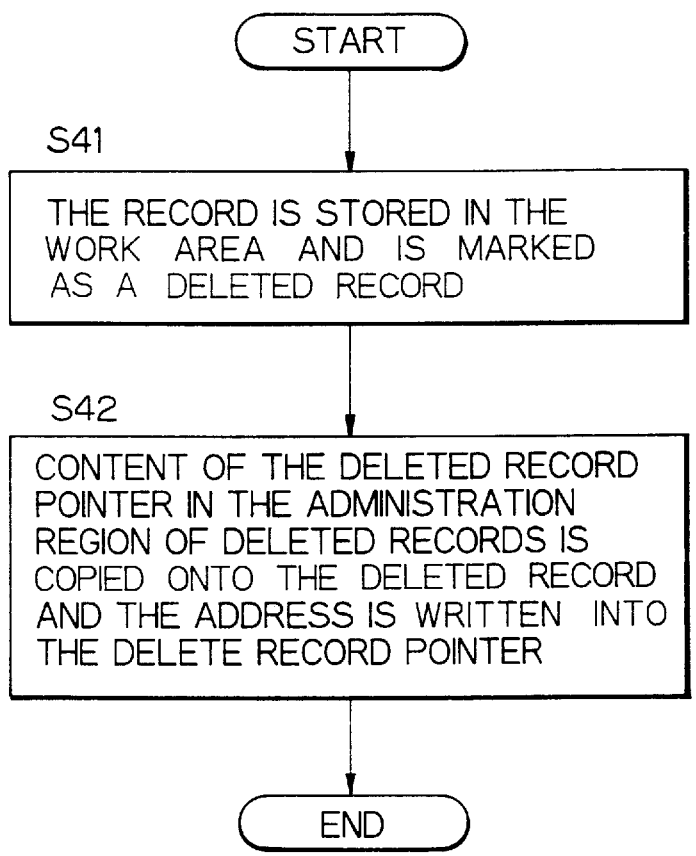
FIG. 9 is a flowchart for reattaching a deleted record according to the present invention.
Figure 10:
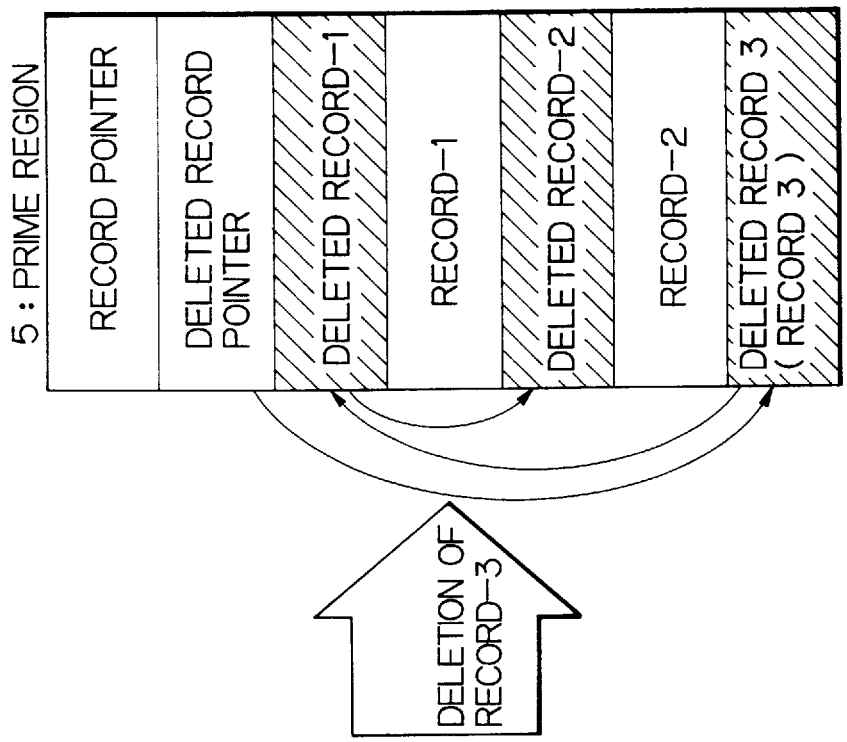
FIGS. 10A and 10B are diagrams explaining the reattachment of the deleted record according to the present invention.
Figure 10:
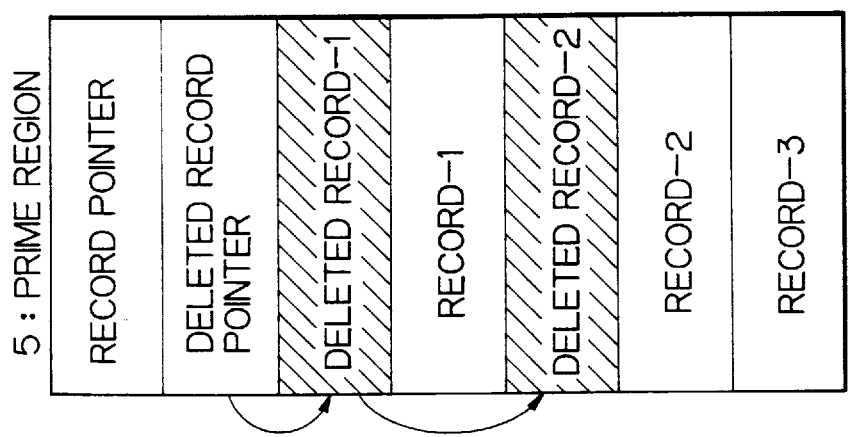

In FIG. 9, a step S41 stores the record in the work area and transforms it into a deleted record. That is, for example, a record 3 in the prime region 5 of FIG. 10(*a*) is stored in the work area and is deleted.

A step S42 copies the content of the deleted record pointer in the administration region of deleted records onto the deleted record, and writes the address onto the deleted record pointer. That is, when, for example, a record 3 of FIG. 10(*a*) is stored in the work area and is deleted, the content of the deleted record pointer is copied onto the deleted record (record 3) and the address (of the record 3) is written onto the deleted record pointer as shown in FIG. 10(*b*). As shown in FIG. 9(*b*), therefore, the record 3 is deleted and changed into an empty record.

Figure 11:
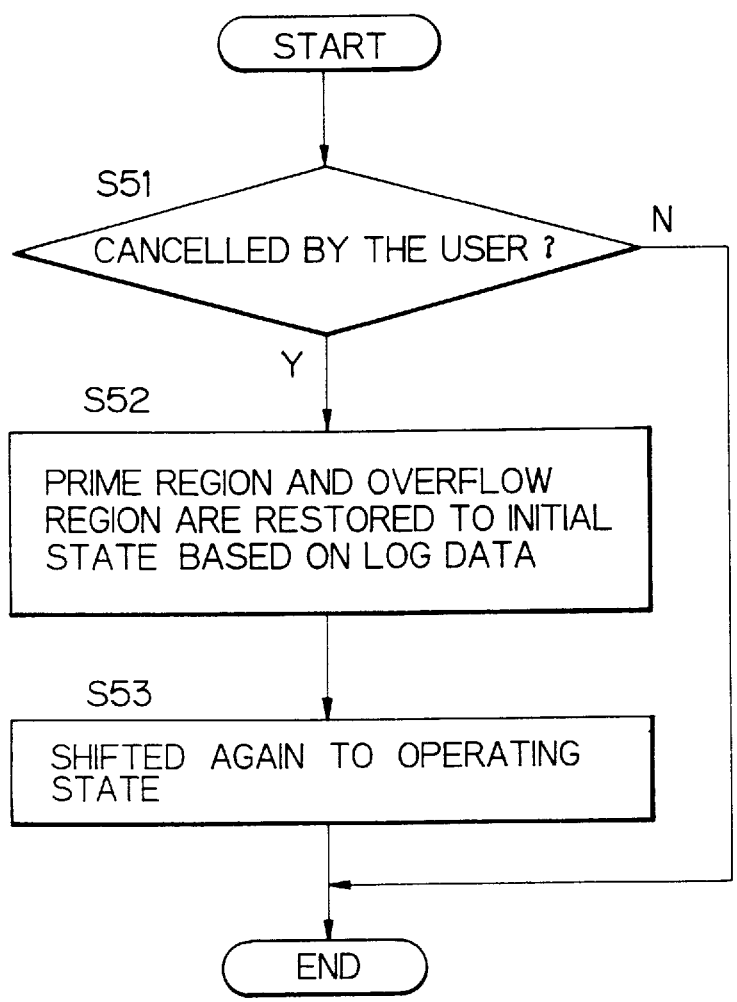
FIG. 11 is a flow chart of interrupt processing according to he present invention.
Figure 12:
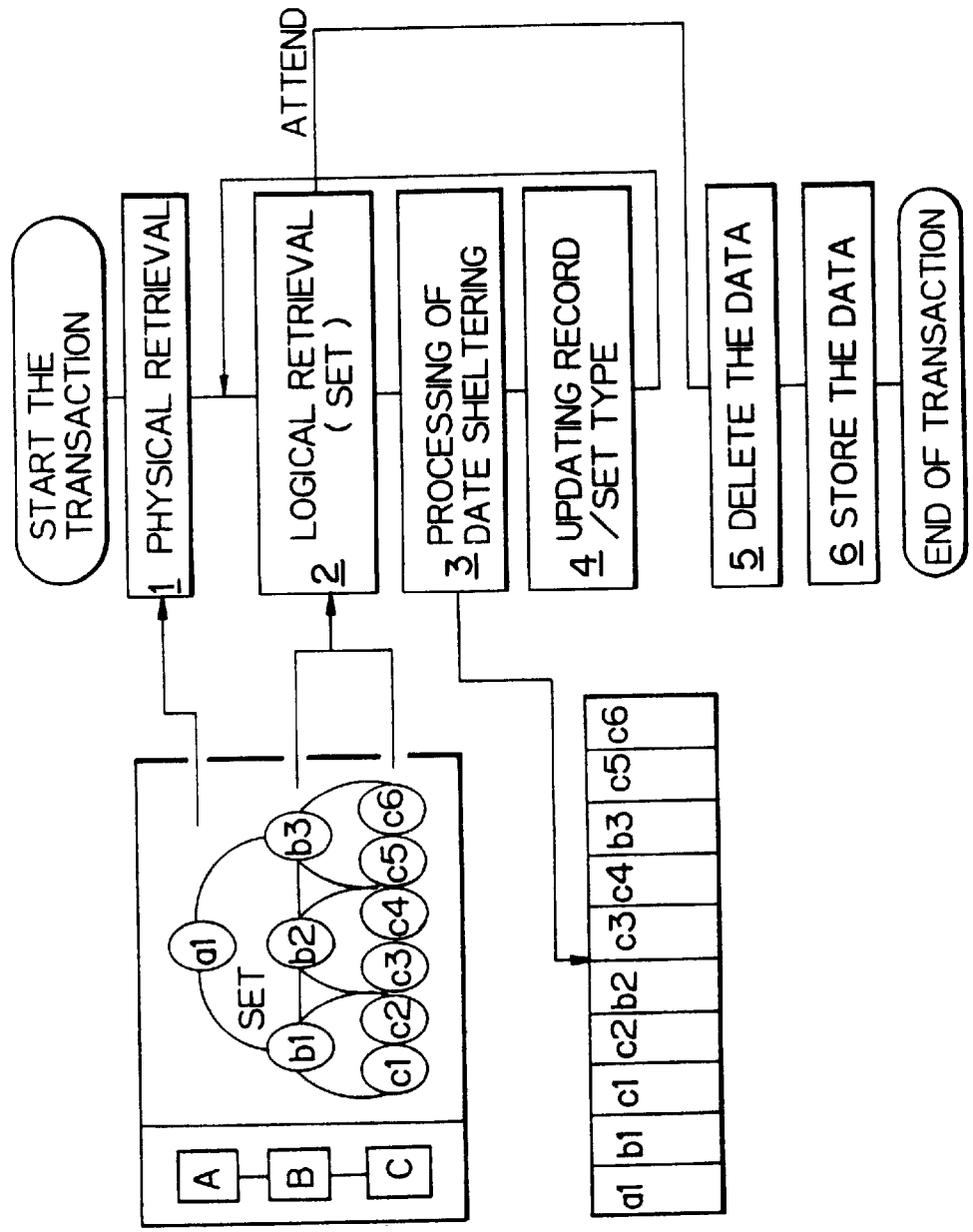
FIG. 12 is a diagram illustrating a example of the present invention.

FIG. 11 is a flowchart of interrupt processing according to the present invention. That is, the record is saved from the prime region 5 and the overflow region 6 into the work area and is marked as a deleted record. Then, the record is taken out from the work area and is stored and relocated in the prime region 5. During this period, in case the user interrupts the relocation processing, the relocation processing is immediately interrupted, the record which is being relocated is restored to the original state, and the prime region 5 and the overflow region 6 are made accessible from the application program, so that the operation will not be halted for extended periods of time. This will be described hereinbelow.

In FIG. 11, a step S51 determines whether the relocation is cancelled by the user. When the answer is yes, the program proceeds to a step S52. When the answer is no, the relocation is not cancelled and, hence, the relocation process continues.

A step S52 restores the prime region 5 and the overflow region 6 to their initial state based on the log data. That is, the database relocation utility 1 saves the records from the prime region 5 and the overflow region 6 into the work area with the record as a unit and marks the records as the deleted records and, during this period, data log is read for returning the records into the initial state. Then, in case the relocation is cancelled as determined by the step S51 while the records are being taken out from the work area and are relocated, such as being packed and stored in the prime region 5 (or in the overflow region 6), and are reattached to the record pointer, the relocation processing is interrupted, and the prime region 5 and the overflow region 6 which have not been relocated are restored to the initial state by making reference to the data log 7.

A step S53 shifts the processing to the operation state again. That is, in the step S52, the prime region 5 and the overflow region 6 are restored to their initial state while the relocation processing is carried out, and the operation is quickly resumed and the service is carried out while making access to the restored prime region 5 and the overflow region 6.

When the interruption of the relocation processing is demanded by the user while the prime region 5 and the overflow region 6 are being relocated, the portions being relocated are restored into the initial prime region 5 and the overflow region 6 by making reference to the data log that had been read, and the service processing is quickly resumed while making the prime region 5 and the overflow region 6 accessible.

FIGS. 12(a)–12(c) are diagrams explaining a concrete example of the present invention.

FIG. 12(a) shows the structure of records and the contents of the database, where A, B and C represent general names of the records, i.e., A is a general name of a1, B is a general name of b1, b2 and b3, and C is a general name of c1 to c6. Here, the records a1, b1, b2 and the like are stored in the prime region 5 and in the overflow region 6.

FIG. 12(b) shows the contents of the saved data which are records saved into the work area from the database 4 during the process ③ in the flow of FIG. 12(c).

Next, described below is the relocation of records in compliance with the order of flow of FIG. 12(c).

① Physical retrieval is carried out. This is to retrieve the general names A, B and C of records that are to be relocated from the database 4.

② Logical retrieval is carried out. This is to successively retrieve the practical records a1, b1, etc., through the link from the general names A, B and C of the records retrieved from the database 4 in ①.

③ Processing of data saving. That is, for example, the record a1 retrieved through the link in the step 2 is taken out, stored and is saved in the work area as shown in FIG. 12(b).

④ Updating of record/set type. That is, the steps ② and ③ are repetitively performed for the next record. After the records have all been saved, the program proceeds to a step ⑤.

⑤ The data are deleted. That is, since the record is saved from the prime region 5 and the overflow region 6 of FIG. 12(a) in the step ③, the record is now marked as a deleted record.

⑥ Store the data. That is, the records saved as shown in FIG. 12(b) are successively stored from the head of the prime region 5 of FIG. 12(a) and are relocated.

As described above, after the physical retrieval (retrieval of general name of records) is carried out, the logical retrieval is successively effected through the link and the records are successively saved in the work area as shown in FIG. 12(b). The saved records are then written back and relocated in the prime region 5.

Figure 13:
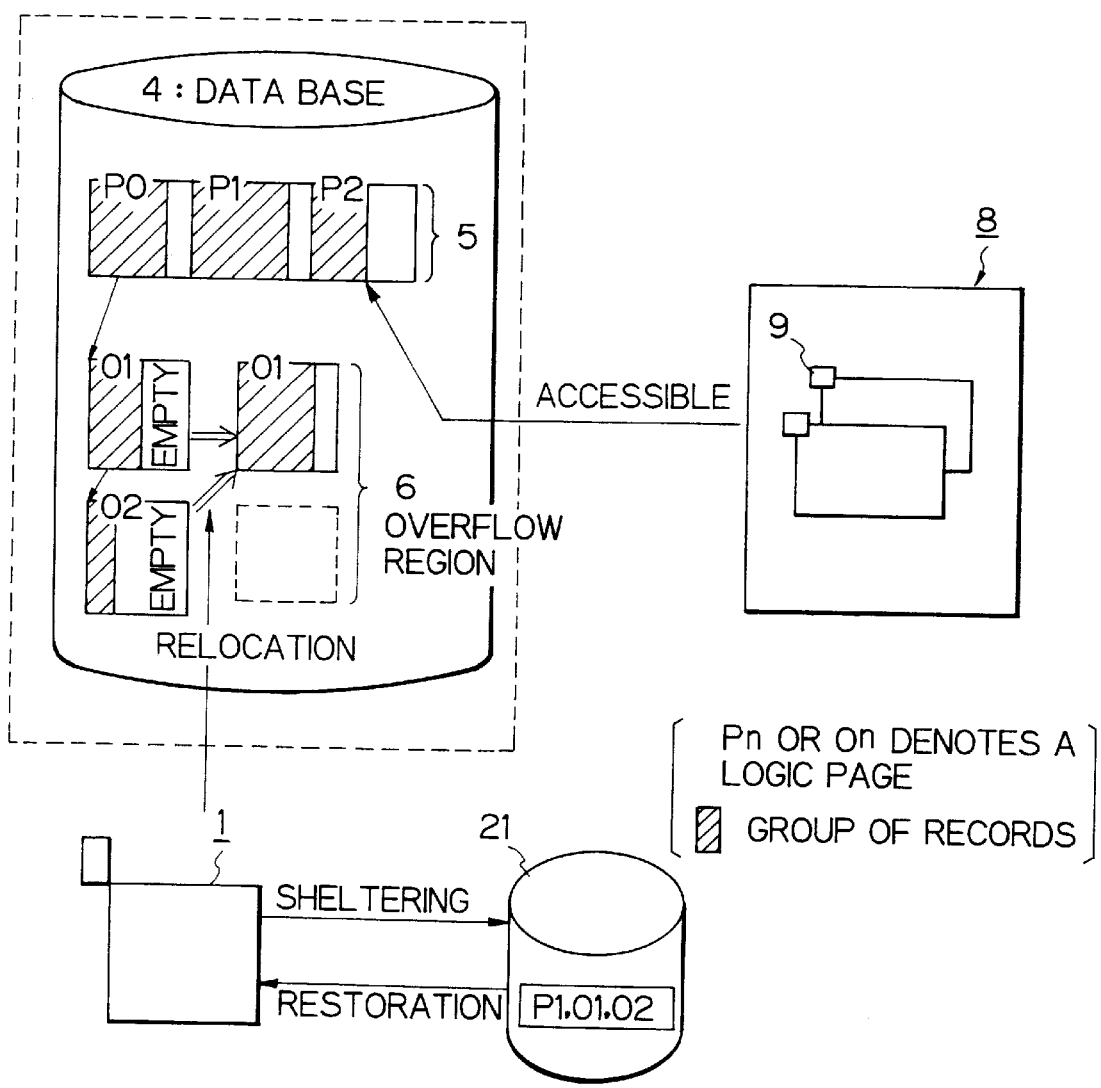
FIG. 13 is a diagram illustrating parallel processing according to the present invention.

FIG. 13 is a diagram explaining the parallel processing according to the present invention.

In FIG. 13, the prime region 5 is constituted by logic pages P0, P1 and P2.

The overflow region 6 is constituted by logic pages O1 and O2, and will become the logic page O1 due to the relocation.

The service process 8 performs a variety of services by accessing the database 4, and is constituted by the application program 9 and the like.

(1) The application program 9 acquires the exclusive access to logic page P2 in the prim region 5 of the database 4 and executes service processing while making this access.

(2) In parallel with the service process of (1), the database relocation utility acquires exclusive access to logic pages O1, O2 in the overflow region 5, saves the records o1, o2 into the work area 21, and writes the records o1, o2 back onto logic page O1 and relocates them.

As described above, the application program 9 and the database relocation utility 1 acquire exclusive access and perform service processing and relocation processing in parallel with the logic page as a unit.

According to the present invention as described above, the prime region 5 and the overflow 6 are relocated in parallel with the execution of the application program by acquiring exclusive access for each of the records (or a plurality of records). The relocation is effected in a limited amount to avoid the processing thereof from being carried out for extended periods of time. The application program is executed predominantly, or the relocation processing is executed intermittently, such that the relocation of the database 4 is executed in parallel affecting the operation of the application program as little as possible.

(1) Therefore, the present invention makes it possible to execute the application program and the processing of the database relocation utility 1 in parallel to accomplish the relocation, though the relocation (deletion of pieces of empty regions spanning the overflow region generated by the addition or deletion of records) of the network database has hitherto been carried out by halting the operation of the application program which utilizes the database.

(2) The relocation has so far been carried out by saving the whole database into the work area and then writing them back to the initial database requiring an work area with a very great capacity. According to the present invention, however, the relocation is carried out with the logic page as a unit or, further, with the record as a unit, requiring an work area of a greatly reduced size.

What is claimed is:

1. A system for relocating records in a database having a prime region and an overflow region in parallel with service processing, the system comprising:

a database relocation utility which, for a predetermined period of time determined based on a frequency of access to the database acquires exclusive access to regions of the prime region and the overflow region for which the service processing has not acquired exclusive access, and saves at least one record of the prime region and the overflow region into a data save area along with a data log, and, when an instruction is issued to interrupt the relocation of records by packing them into the prime region and in the overflow region, restores the prime region and the overflow region based upon the data log to restart a process by the database relocation utility from an interruption point.

2. A system according to claim 1, wherein said database relocation utility acquires exclusive access to regions of the prime region and the overflow region for which the service processing has not acquired exclusive access, saves at least one record of said prime region and said overflow region into the data save area and preserves a data log therein, and, in case an instruction is issued to interrupt the relocation of records by packing them into the prime region and in the overflow region, restores the prime region and the overflow region based upon the data log to restart a process by the database relocation utility from an interruption point.

3. A system for relocating records in a database having a prime region and an overflow region in parallel with service processing, the system comprising:

a database relocation utility which acquires exclusive access to regions of the prime region and the overflow region for a predetermined period of time determined based on the frequency of access to the database and for which the service processing has not acquired exclusive access, and saves a predetermined number of records of the prime region and the overflow region into a data save area, and, then relocates the records by packing the predetermined number of records in the regions of the prime region and the overflow region for which the service processing has not acquired exclusive access over the predetermined period of time.

4. A system according to claim 3, wherein said database relocation utility acquires exclusive access to regions of the prime region and the overflow region for which the service processing has not acquired exclusive access, saves at least one record of said prime region and said overflow region into the data save area and preserves a data log therein, and, in case an instruction is issued to interrupt the relocation of records by packing them into the prime region and in the overflow region, restores the prime region and the overflow region based upon the data log to restart a process by the database relocation utility from an interruption point.

5. A method for relocating records in a database, comprising the steps of:

acquiring exclusive access for a predetermined period of time determined based on a frequency of access to the database to regions of the prime region and overflow region of the database for which the service processing has not acquired exclusive access, while operating in parallel with a service process;

saving into a data save area a unit of transaction having a predetermined number of records stored in the prime region and the overflow region in the database; and relocating the saved records by packing them in the prime region or in the overflow region.

6. A method for data relocation processed by a database relocation utility as set forth in claim 5, wherein said exclusive access to a region of the database is acquired for a predetermined time period determined based on frequency of access to the database.

7. A method as set forth in claim 5, further including a step for selecting a region of the prime region and the overflow region in the database, the selected regions not being accessed by service processes for a predetermined period of time.

8. A method as set forth in claim 5, further including a step for selecting a region of the prime region and the overflow region in the database, the selected regions not being accessed by a service process at a predetermined frequency of access.

9. A method as set forth in claim 5, further including a step for preserving a data log related to the saved records when saving into a data save area the predetermined number of records stored in a prime region and an overflow region in the database, and a step for restoring the prime region and the overflow region based on the data log to restart a process by the database relocation utility from an interruption point when an interruption of the relocation occurs.

10. A method as set forth in claim 5, further including a step for releasing an unnecessary overflow region by said relocation.

* * * * *